US012571513B2

(12) United States Patent
Engler et al.

(10) Patent No.: US 12,571,513 B2
(45) Date of Patent: Mar. 10, 2026

(54) HEADLIGHT FOR VEHICLES AS WELL AS ADJUSTMENT METHOD

(71) Applicant: HELLA GMBH & CO. KGAA, Lippstadt (DE)

(72) Inventors: Ingo Engler, Soest (DE); Ludger-Josef Grüne, Höxter (DE); Miguel Lebrato-Rastrojo, Paderborn (DE); Thomas Albert Röbbecke, Erwitte (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/901,518

(22) Filed: Sep. 30, 2024

(65) Prior Publication Data

US 2025/0109832 A1 Apr. 3, 2025

(30) Foreign Application Priority Data

Oct. 2, 2023 (DE) ......................... 102023126816.3

(51) Int. Cl.
*F21S 41/657* (2018.01)
*F21S 41/143* (2018.01)
(Continued)

(52) U.S. Cl.
CPC ........... *F21S 41/657* (2018.01); *F21S 41/143* (2018.01); *F21S 41/151* (2018.01); *F21S 41/19* (2018.01)

(58) Field of Classification Search
CPC ...... F21S 41/657; F21S 41/143; F21S 41/151; F21S 41/19; F21S 41/153; F21S 41/65;
(Continued)

(56) References Cited

U.S. PATENT DOCUMENTS 1,426,162 A * 8/1922 Eisele .................. B60Q 1/1438 362/280
2008/0013329 A1* 1/2008 Takeda .................. F21S 41/143 362/459

FOREIGN PATENT DOCUMENTS

CN 207350212 U 5/2018
CN 209928110 U * 1/2020 ......... H02K 41/0356
DE 102016013510 A1 * 10/2017 ............ F21S 41/255

OTHER PUBLICATIONS

Search English translation of CN-209928110-U (Year: 2020).*
Search English translation of DE-102016013510-A1 (Year: 2017).*

* cited by examiner

*Primary Examiner* — Omar Rojas Cadima
(74) *Attorney, Agent, or Firm* — WARNER NORCROSS + JUDD LLP

(57) ABSTRACT

The invention relates to a headlight with a light source unit and a lens arrangement which is arranged at a predetermined distance from the light source unit for generating a predetermined light image, with a printed circuit board to which the light source unit is electrically contacted, and with a holding device for holding the lens arrangement on a body which is firmly connected to the printed circuit board. A distance adjustment device includes an actuating element which moves in the direction of an optical axis and which engages the light source unit and the printed circuit board, an actuator which can be brought into operative interconnection with the actuating element for adjusting the same, and a control device for controlling the actuator such that the actuating element is moved by in the direction of the optical axis until the currently generated light image corresponds to a predetermined light image.

14 Claims, 1 Drawing Sheet

(51) Int. Cl.
*F21S 41/151* (2018.01)
*F21S 41/19* (2018.01)

(58) Field of Classification Search
CPC ........... F21W 2102/00; F21W 2107/10; F21Y 2115/10; B60Q 1/076; G03B 13/36; G03B 13/34; G03B 13/32; G03B 2205/0069; G03B 2205/0084; H02K 41/0356
See application file for complete search history.

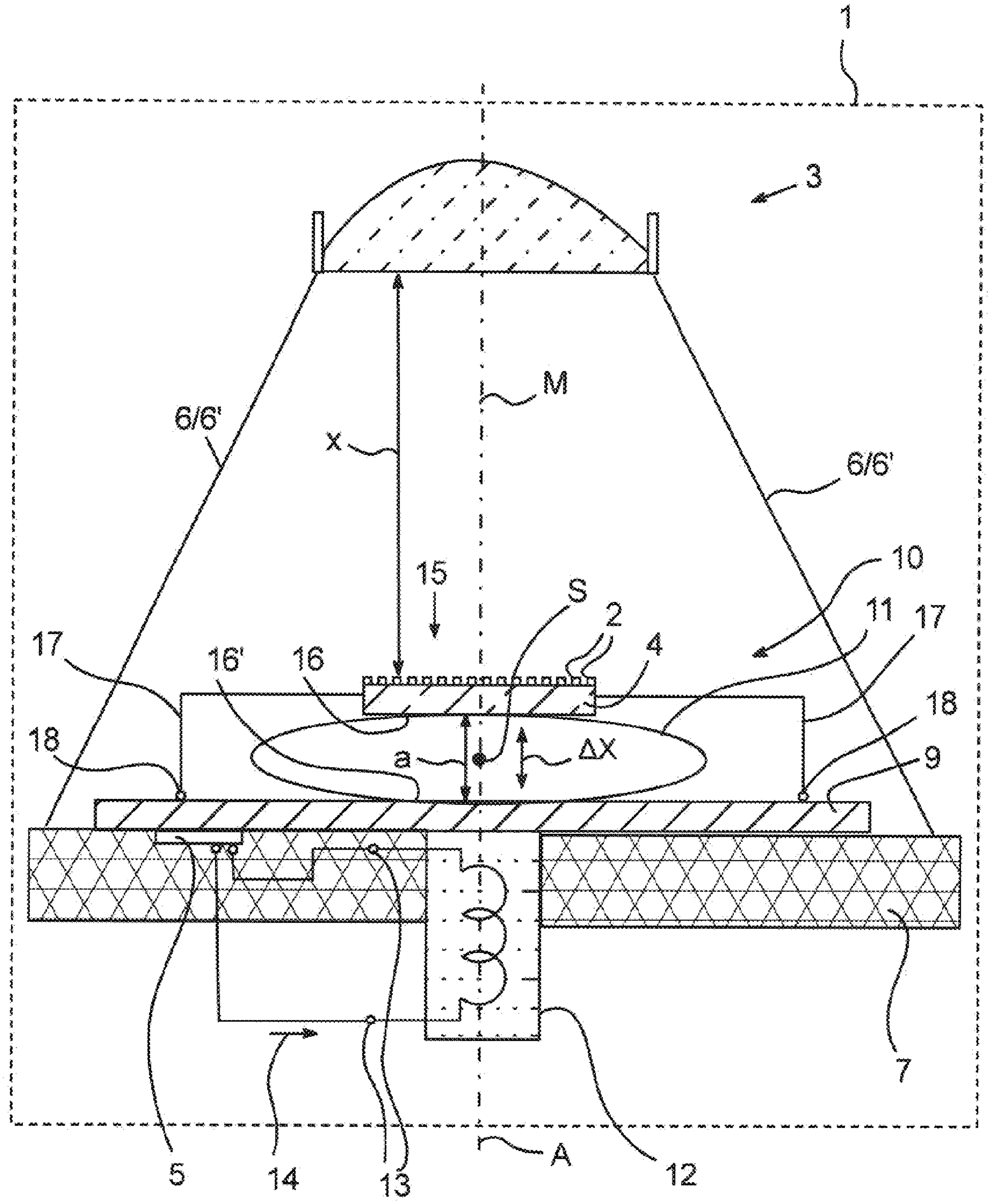
1
3
M
x
6/6'
6/6'
15
10
S
2
11
17
17
16'
16
4
18
18
a
ΔX
9
5
14
13
A
12
7

HEADLIGHT FOR VEHICLES AS WELL AS ADJUSTMENT METHOD

CROSS-REFERENCE TO RELATED APPLICATIONS

The present application claims the benefit of German Patent Application No. 10-2023-126-816.3, filed Oct. 2, 2023, the disclosure of which is incorporated by reference.

FIELD OF THE INVENTION

The invention relates to a headlight for vehicles with a light source unit comprising a number of light sources and a lens arrangement which is arranged at a predetermined distance from the light source unit for generating a predetermined light image, with a printed circuit board to which the light source unit is electrically contacted, and with a holding device for holding the lens arrangement on a body which is firmly connected to the printed circuit board. The invention, moreover, relates to a distance adjustment device and a method for adjusting a predetermined light image.

BACKGROUND OF THE INVENTION

A headlight for vehicles is known from DE 10-2020-114-767, which headlight comprises individually controllable light sources as well as a lens arrangement for generating a predetermined light distribution. The light sources are arranged on a common printed circuit board. The lens arrangement comprises a basic adjustment lens, which is adjustable in the direction of an optical axis of the lens arrangement by means of an actuator, so that the light distribution is set for a desired dispersion width or alternatively a predetermined light pattern. After fixing the basic adjustment lens, the light pattern of the headlight is determined. The disadvantage of the known headlights is that the adjustment is relatively complex.

WO2019/170270 discloses a headlight for vehicles with a number of light sources and a lens arrangement for generating a predetermined light distribution. The light sources are arranged on a printed circuit board. The lens arrangement is fastened by means of a holding device to a body which is firmly connected to the printed circuit board. The lens arrangement is arranged at a fixed distance to the light sources.

SUMMARY OF THE INVENTION

The task of the present invention is to provide a headlight for vehicles, a distance adjustment device as well as a method for adjusting a predetermined light image at low manufacturing costs in such a way that the possibility of subsequent basic adjustment is made possible.

To solve this problem, a distance adjustment device is provided with an actuating element which can be moved back and forth in the direction of an optical axis of the lens arrangement and which actuating element engages on the light source unit and on the printed circuit board, an actuator which can be brought into operative interconnection with the actuating element for adjusting the same, a control device containing control means for controlling the actuator in such a way that the actuating element is moved by a path difference in the direction of the optical axis until the currently generated light image corresponds to a predetermined light image.

The particular advantage of the headlight according to the invention is that a distance adjustment device according to the invention enables simple optical focusing of the light source unit. The distance of the light source unit to the lens arrangement required for generating the predetermined light image or light distribution is achieved simply by a controllable actuating element that moves back and forth which engages both the light source unit and a printed circuit board to which the light source unit is electrically connected. The basic idea of the invention is to subsequently change a distance of the light source to the printed circuit board, which is to say, after the fastening of the lens arrangement and the light source unit within a housing of the lighting device so that the light source unit is arranged at the distance to the lens arrangement required for the specified light distribution. Advantageously, there is no need to adjust the lens arrangement to the light source unit, which is relatively complex with regard to the material connection of the lens arrangement holder.

According to a preferred embodiment of the invention, the actuating element is configured as a spring element, the body extension of which can be varied in the direction of an optical axis of the lens arrangement. Advantageously, the light source unit can be changed in the distance to the lens arrangement by applying a movement force acting on the spring element so that the predetermined light field is generated. Undesirable bonding processes are not required for this.

According to a further development of the invention, the spring element is configured as a magnetizable spring element, wherein an actuator is configured as a magnetic field generator. The shape of the spring element can be changed or the extension of the spring element in the direction of the optical axis can be changed by means of a magnetic field generated by the magnetic field generator.

According to a further development of the invention, the magnetic field generator is configured as a current-carrying coil, the axis of which is oriented in the direction of the optical axis of the lens arrangement. In this way, a maximum magnetic field strength is generated in the direction of the optical axis, which leads to a simple change in the body extension of the spring element in the direction of the optical axis. The current-carrying coil can be arranged without optical interference on a side of the printed circuit board facing away from the light source unit.

According to a further development of the invention, the spring element is configured as a spacer ring with a ring axis that runs perpendicular to the optical axis as well as to an axis of the magnetic field coil. In this way, a compression and an elongation of the spring element can easily lead to a change in the path difference of the light source unit in relation to the lens arrangement. The ferromagnetic material of the spring element, moreover, enables heat to be dissipated from the light source unit in the direction of the printed circuit board or alternatively an adjoining heat sink.

According to a further development of the invention, electrical connections of the light source unit are connected to electrical connections of the printed circuit board by means of an electrical interconnection, in particular by means of a wire interconnection. The light source unit is thereby electrically connected or coupled to the printed circuit board, whereas it is mechanically coupled and/or connected to the spring element. The light source unit is thereby always physically arranged at a distance from the printed circuit board.

According to a further development of the invention, the light source unit is arranged flat on the spring element. On the one hand, the spring element can be arranged loosely at points of contact between the light source unit and the printed circuit board, wherein a spring force of the spring element ensures a clamping of the spring element between the printed circuit board and the light source unit. Alternatively, the spring element can also be connected to the light source unit and the printed circuit board with a material bond, so that no measures are required for fastening the light source unit.

According to a further development of the invention, the spring element is arranged spring-loaded between the light source unit and the printed circuit board. Advantageously, the spring element can hereby be clamped between the light source unit and the printed circuit board.

According to a further development of the invention, the light source unit comprises a plurality of individually controllable light sources in a matrix form, which can be focused relative to the lens element by means of the same spring element.

A distance adjustment device is provided to solve the task, which device enables simple basic adjustment of the headlight, wherein a compression or an elongation of an actuating element is performed by means of an actuator. Since the actuating element is located between the light source unit and the printed circuit board, a focusing of the light source unit in relation to the lens arrangement can be performed easily.

To solve the task, the light source unit is moved so far relative to the printed circuit board until the currently generated light image corresponds to a predetermined light image, and in that the adjusted distance between the light source unit and the printed circuit board is then fixed.

The particular advantage of the method according to the invention is that a simple basic adjustment of the headlight is made possible by moving a light source unit in relation to a fixed lens arrangement. The at least one lens of the lens arrangement can advantageously be fastened to a body, for example a housing of the lighting device, by means of, for example, a lens holder. Tolerances that arise in the material-locking fastening of the lens arrangement can easily be compensated for by moving the light source unit.

According to a further development of the method according to the invention, the movement of the light source unit occurs by means of a magnetizable spring element which engages on the light source unit and is compressed or elongated by varying the magnetic field, bringing about the effect whereby the relative position of the light source unit to the lens arrangement can be adjusted or alternatively set. Advantageously, this adjustment can also be carried out during inspections of the vehicle, wherein the adjustment can be carried out in a simple manner by electrical control of the magnetic field generator.

These and other features and advantages of the present invention will become apparent from the following description of the invention. Before the embodiments of the invention are explained in detail, it is to be understood that the invention is not limited to the details of operation set forth in the following description. The invention may be implemented in various other embodiments and of being practiced or being carried out in alternative ways not expressly disclosed herein. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWING

One embodiment of the invention is elucidated in more detail below with reference to the drawing. Wherein:

FIG. 1 shows a schematic representation of a headlight according to an embodiment of the invention.

DETAILED DESCRIPTION OF THE CURRENT EMBODIMENTS

A headlight according to the invention comprises a housing 1 in which a plurality of individually controllable light sources 2 and a lens arrangement 3 configured as a light guiding means are arranged to generate a predetermined light distribution or light image.

The light sources 2 are respectively configured as LED light sources or alternatively LED chips, which are fastened on a common substrate 4. A control device 5, which can be arranged inside the housing 1 or outside the housing 1, is provided for the electrical control of the light sources 2. By way of example, 16,000 light sources 2 are arranged in an m×n matrix so that, depending on the control of the light sources 2 by means of the lens arrangement 3, a glare-free high beam distribution (adaptive light) can be generated.

The lens arrangement 3 can have one or a plurality of lenses. In the present embodiment example, the lens arrangement 3 has a plano-convex lens which is fixed to a body 7 by means of a holding device 6. The holding device 6 comprises a number of holding arms 6', which are inserted in an adhesive bed of holding tabs, which are not shown, of the body 7.

The body 7 is configured as a heat sink to which a printed circuit board 9 is fixed. The printed circuit board 9 comprises electronic components by means of which the headlights are operated. By way of example, the control device 5 can be arranged on the printed circuit board 9.

A distance adjustment device 10 is provided for the basic setting of the headlights, namely for setting a predetermined distance X between the light sources 2 on the one hand and the lens arrangement 3 on the other, which distance adjustment device comprises a back-and-forth actuating element 11 on the one hand and, on the other, an actuator 12 in operative interconnection with the actuating element 11.

The actuating element 11 is arranged between the plurality of light sources 2 on the one hand and the printed circuit board 9 on the other. The actuating element 11 is configured as a spring element, the extension of which can be varied in the direction of an optical axis A of the lens arrangement 3.

In the present embodiment example, the actuator 12 is configured as a magnetic field generator, in particular as an electric coil for generating a magnetic field, wherein the spring element 11 is configured to be magnetizable. The spring element 11 consists of a ferromagnetic material. In the present embodiment example, it is configured as a spacer ring that has an axis of symmetry S running perpendicular to the optical axis A.

The current-carrying coil 12 is electrically connected to the control device 5, so that signals 14, namely an electric current, are generated by corresponding distance control means of the control device 5. The magnetic field generated by the current-carrying coil 12 is changed in such a way by means of the control signal 14, that the magnetizable spring element 11 is compressed or elongated by a path difference ΔX in the direction of the optical axis A, with the effect that the distance X of the light sources 2 to the lens arrangement 3 changes until the specified light image, for example, on a measuring wall, is set. The change in shape of the spring element 11 causes a change in the path difference ΔX, which is to say, a distance or the distance X of the light sources 2 to the lens arrangement 3 as well as a distance a between the light sources 2 on the one hand and the printed circuit board 9 on the other.

By way of example, the substrate 4 of a light source unit 15 formed by the plurality of light sources 2 and the substrate 4 can be firmly and preferably flatly connected to one side 16 of the spring element 11 and the printed circuit board 9 can be connected to an opposite side 16' of the spring element 11. By way of example, this interconnection can be materially or frictionally bonded.

Alternatively, the spring element 11 can be arranged spring-loaded between the light source unit 15 and the printed circuit board 9, wherein the spring element 11 is held clamped between the light source unit 15 and the printed circuit board 9. In this case, the light source unit 15 would need to be held by fastening means, that is not shown, at a maximum distance a from the printed circuit board 9, so that the spring element 11 can only be compressed for the basic setting, but not elongated.

The spring element 11 is made of a metal material so that heat generated in the light source unit 15 can flow away to the printed circuit board 9 or alternatively to the heat sink 7.

If the spring element 11 is, for example, configured as a metal spring, it preferably has a constant spring stiffness so that a proportionality exists between the magnetic force acting on it and the path difference ΔX.

The control of the current-carrying coil 12 can take place by the same control device 5 that is responsible for controlling the light sources 2. For example, the control device 5 is positioned on the printed circuit board 9. The substrate 4 or alternatively the light source unit 15 is mechanically connected to the actuating element 11. Electrical connections of the light sources 2 of the light source unit 15 are electrically connected to the printed circuit board 9. By way of example, the electrical interconnection is established by an electrical wire 17 (wire interconnection). Electrical connections 18 of the printed circuit board 9 are arranged at a distance from one another that is greater than a minimum extension of the actuating element 11 running transversely to the optical axis A. The two electrical wires 17 must therefore be guided past the actuating element 11 so that the printed circuit board 9 is at least as long or as wide as a length or alternatively width of the actuating element 11.

The actuating element 11 is arranged symmetrically to a center plane M, wherein the center plane M runs through the optical axis A and perpendicular to the printed circuit board 9. In this way, a defined linear movement perpendicular to the printed circuit board 9 or in the direction of the optical axis A can be achieved by corresponding control of the actuating element 11 by the actuator 12.

Alternatively, the actuator 12 can also be in a different position relative to the printed circuit board 9 or alternatively further actuators can be arranged in order not only to perform a linear adjustment of the light source unit 15, but rather also to bring about a tilting effect of the light source unit 15, so that the light source unit 15 cannot be adjusted parallel to the printed circuit board 9. By way of example, a three-dimensional adjustment of the light source unit 15 relative to the printed circuit board 9 and to the lens arrangement 3 can hereby occur.

The distance setting procedure takes place as follows. The components of the headlight, namely the light source unit 15, the printed circuit board 9 with the electronic components, and the lens arrangement 3 are fixed, wherein the light source unit 15 is fixed on one side 16 and the printed circuit board 9 on the other side 16' of the actuating element 11, preferably with a material connection. The actuator 12 is positioned and fastened on a side of the printed circuit board 9 facing away from the light source unit 15 in such a way that an axis of the current-carrying coil 12 runs along the optical axis A of the lens arrangement 3. The current-carrying coil 12 is fastened, for example, on a side of the printed circuit board 9 facing away from the light source unit 15, wherein electrical connections 13 of the coil 12 are connected to the electronic control device 5. The electrical contacting of the light sources 2 takes place by means of the wire interconnection 17 with corresponding electrical connections 18 of the printed circuit board 9. The electrical connections 18 are electrically connected to corresponding connections of the control device 5. For this purpose, the printed circuit board 9 comprises corresponding conductor tracks.

The basic adjustment of the headlight is carried out by the manufacturer in a corresponding apparatus, wherein the light source unit 15 is controlled by the control device 5 to, for example, compare the currently generated light image with a predefined light image (target light image) on a measuring screen. By controlling the actuator 12, the actuating element 11 is moved or alternatively compressed or elongated until the current light image corresponds to the target light image. Finally, the herewith present control signal 14 (control means), which is sent from the control device 5 to the actuator 12, is fixed or "frozen". This completes the basic setting.

Since the components of the distance adjustment device 10, namely the actuating element 11, the actuator 12 and the control device 5 are installed in the headlights, the basic setting can also be adjusted after the headlights have been installed in the vehicle, for example during an inspection in a workshop. The advantage of this is that the basic setting can be adjusted quickly if environmental conditions or disturbance variables change.

According to an alternative embodiment of the invention that is not shown, the actuating element 11 can also be configured as a cylindrical or spiral spring element. The path difference ΔX is preferably in the mm range.

LIST OF REFERENCE NUMERALS

1 housing
2 light sources
3 lens arrangement
4 substrate
5 control device
6, 6' holding device/holding arm
7 body
9 printed circuit board
10 distance adjustment device
11 actuating element/spring element
12 actuator
13 electrical connection
14 distance control means
15 light source unit
16, 16' side
17 electrical wire
18 electrical connections
a distance X distance
ΔX path difference
A optical axis
S axis of symmetry
M center plane The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A headlight for vehicles, the headlight comprising:

a light source unit including plurality of light sources, wherein the light source unit is electrically connected to a printed circuit board;

a lens arrangement, wherein the light source unit is arranged at an adjustable distance from the lens arrangement for generating a predetermined light image;

a holding device for holding the lens arrangement on a body which is firmly connected to the printed circuit board; and a distance adjustment device including:

an actuating element having a length which can be adjusted in the direction of an optical axis of the lens arrangement, the actuating element being disposed between and engaging the light source unit and the printed circuit board, an actuator which can be brought into operative interconnection with the actuating element for adjusting the length of the actuating element, and a control device for controlling the actuator in such a way that the actuating element is compressed or elongated by a path difference in the direction of the optical axis until a currently generated light image corresponds to the predetermined light image.

2. The headlight of claim 1, wherein the actuating element is configured as a spring element, the extension of which can be varied in the direction of the optical axis.

3. The headlight of claim 2, wherein the spring element is configured as a magnetizable spring element, the magnetizable spring element being formed from a ferromagnetic material and including a length that is directly varied by operation of a magnetic field, and wherein the actuator is configured as a magnetic field generator, such that the actuator varies the length of the magnetizable spring element.

4. The headlight of claim 3, wherein the magnetic field generator is configured as a current-carrying coil which is arranged on a side of the printed circuit board facing away from the light source.

5. The headlight of claim 2, wherein the spring element is configured as a spacer ring that has an axis of symmetry running perpendicular to the optical axis and perpendicular to the path difference.

6. The headlight of claim 2, wherein the spring element is thermally conductive and wherein the body is configured as a heat sink to dissipate heat from the spring element.

7. The headlight of claim 2, wherein the spring element engages flatly on the light source unit and on the printed circuit board.

8. The headlight of claim 2, wherein the spring element is spring-loaded between the light source unit and the printed circuit board.

9. The headlight of claim 2, wherein the spring element is a metal spring with a constant spring stiffness.

10. The headlight of claim 1, wherein the light source unit is connected to the printed circuit board via an electrical interconnection.

11. The headlight of claim 1, wherein the light source unit comprises a matrix field with a plurality of LED light sources.

12. A distance adjustment device comprising:

an actuating element having a length which can be adjusted in the direction of an optical axis, the actuating element being disposed between and engaging a light source unit and a printed circuit board, an actuator which can be brought into operative interconnection with the actuating element for adjusting the length of the actuating element, and a control device for controlling the actuator in such a way that the actuating element is compressed or elongated by a path difference in the direction of the optical axis until a currently generated light image corresponds to a predetermined light image.

13. A method for adjusting a predetermined light image for a headlight, comprising:

providing the headlight of claim 1, in which the lens arrangement and the printed circuit board are fixed in relation to each other; and moving the light source unit relative to the printed circuit board by operation of the actuator until the currently generated light image corresponds to the predetermined light image and thereafter fixing a distance between the light source unit and the printed circuit board.

14. The method of claim 13, wherein moving the light source unit relative to the printed circuit board is performed by a magnetizable spring element.

* * * * *